(12) United States Patent
Yamada et al.

(10) Patent No.: US 10,838,198 B2
(45) Date of Patent: Nov. 17, 2020

(54) ACTUATOR AND LIGHT SCANNING APPARATUS

(71) Applicants: Tsukasa Yamada, Tokyo (JP); Takahiro Wakasugi, Tokyo (JP)

(72) Inventors: Tsukasa Yamada, Tokyo (JP); Takahiro Wakasugi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 132 days.

(21) Appl. No.: 16/351,808

(22) Filed: Mar. 13, 2019

(65) Prior Publication Data

US 2019/0302447 A1    Oct. 3, 2019

(30) Foreign Application Priority Data

Mar. 30, 2018 (JP) ................. 2018-069569

(51) Int. Cl.
| | |
|---|---|
| *G02B 26/08* | (2006.01) |
| *G02B 26/12* | (2006.01) |
| *G02B 26/10* | (2006.01) |
| *G02B 7/182* | (2006.01) |

(52) U.S. Cl.
CPC .......... *G02B 26/12* (2013.01); *G02B 7/1821* (2013.01); *G02B 26/105* (2013.01)

(58) Field of Classification Search
CPC ........ G02B 26/12; G02B 26/10; G02B 26/08; G02B 26/0833; G02B 26/0858; G02B 26/101; G02B 7/1821; G02B 26/105; B81B 3/00

USPC ........................................ 359/197.1
See application file for complete search history.

(56) References Cited

U.S. PATENT DOCUMENTS 6,392,220 B1 * 5/2002 Slater ................ H04Q 11/0005
250/216

FOREIGN PATENT DOCUMENTS

JP    2014-238581    12/2014

* cited by examiner

*Primary Examiner* — Euncha P Cherry
(74) *Attorney, Agent, or Firm* — IPUSA, PLLC

(57) ABSTRACT

An actuator includes a torsion beam configured to support a target object, a first drive beam having a first drive source, and a connection beam configured to connect the torsion beam with the first drive beam, and a frame body configured to fix the first drive beam, wherein the actuator applies force of rotating the torsion beam in a direction around a first axis by a resonant drive of the first drive beam so as to cause the target object to swing, and when a structural non-linear constant of the actuator is β [Nm/rad3] and a spring constant of the actuator is k [Nm/rad], [Equation 1] is satisfied:

[Equation 1]

$$\beta = 0.05 \times k - A \times 10^6 \quad (1),$$

where $3.5 \leq A \leq 15.5$.

6 Claims, 14 Drawing Sheets

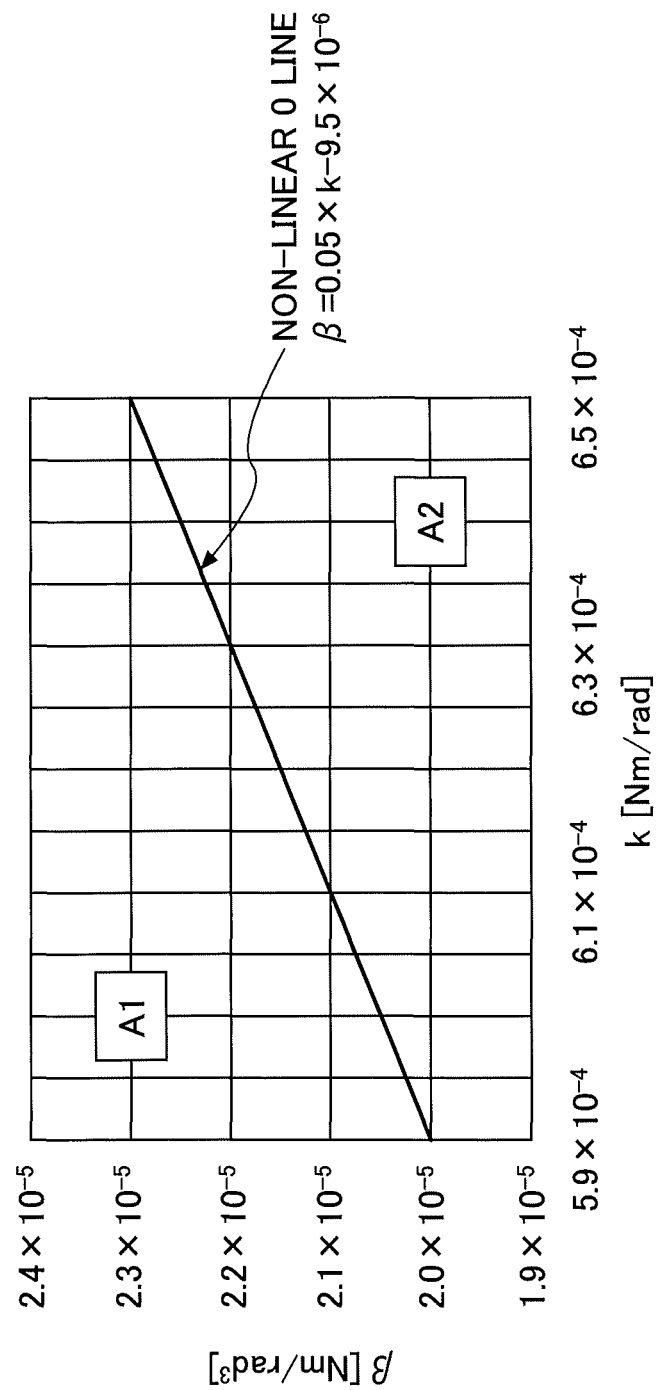

ACTUATOR AND LIGHT SCANNING APPARATUS

CROSS-REFERENCE TO RELATED APPLICATIONS

This patent application is based upon and claims priority under 35 U.S.C. § 119 to Japanese Patent Application No. 2018-069569 filed on Mar. 30, 2018, the entire contents of which are incorporated herein by reference.

BACKGROUND OF THE INVENTION

1. Field of the Invention

The present invention relates to an actuator and a light scanning apparatus.

2. Description of the Related Art

There is known a light scanning apparatus which scans light while rotating a mirror portion around a rotation axis. One example of the light scanning apparatus is a resonance/non-resonance 2D-MEMS mirror. An actuator forming a MEMS mirror includes a horizontal drive beam and a vertical drive beam. The mirror is displaced in a direction of rotating around a horizontal direction rotation axis by resonant drive of a horizontal drive beam, and is displaced in a direction of rotating around a vertical direction rotation axis by non-resonant drive of a vertical drive beam. With this, light reflected by the mirror is scanned in the horizontal and vertical directions (for example, Patent Document 1).

In a characteristic curve of a deflection angle relative to the frequency of a light scanning apparatus such as the resonance/non-resonance 2D-MEMS mirror, a curve obtained by connecting resonant points at a time of enlarging the deflection angle by increasing the applied voltage to a piezoelectric element is called a backbone curve. The deflection angle is enlarged when the applied voltage is increased by fixing the frequency.

When the deflection angle is gradually increased during the resonant drive of the actuator of the light scanning apparatus, a non-linear leaping phenomenon may occur. The non-linear leaping phenomenon is a phenomenon in which the deflection angle abruptly changes at a certain frequency in the frequency response of the deflection angle. The non-linear leaping phenomenon appears due to a non-linearity of a reverse piezoelectric characteristic of a piezoelectric element and a non-linearity being the summation of a structural non-linearity of an actuator.

Patent Document 1: Japanese Patent No. 5967145

SUMMARY OF THE INVENTION

In a case where the non-linearity is not optimized in the actuator of the light scanning apparatus, there is a phenomenon in which the backbone curve deflects on a side of low frequency or high frequency in the characteristic curve of the deflection angle relative to the frequency. In this case, there is a problem that even if the drive voltage is increased the deflection angle is saturated to prevent a large deflection angle from obtaining.

The present invention is provided in consideration of the above. The objects of the present invention are to suppress occurrence of a leaping phenomenon caused by non-linear oscillation during resonant drive of the actuator in the actuator and to enable stable driving in a large deflection angle.

An actuator includes a torsion beam configured to support a target object, a first drive beam having a first drive source, and a connection beam configured to connect the torsion beam with the first drive beam, and a frame body configured to fix the first drive beam, wherein the actuator applies force of rotating the torsion beam in a direction around a first axis by a resonant drive of the first drive beam so as to cause the target object to swing, and when a structural non-linear constant of the actuator is β [Nm/rad3] and a spring constant of the actuator is k [Nm/rad], [Equation 1] is satisfied:

[Equation 1]

$$\beta = 0.05 \times k - A \times 10^{-6} \quad (1)$$

where $3.5 \leq A \leq 15.5$.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not suppressive of the invention as claimed.

BRIEF DESCRIPTION OF THE DRAWINGS

FIG. 8 illustrates a relation (a non-linear 0 line) of k (a spring constant) of the light scanning part of the light scanning apparatus relative to β (a structural non-linear constant) of the embodiment.

DETAILED DESCRIPTION OF EMBODIMENTS

Hereinafter, preferred embodiments of the present invention are explained with reference to accompanying drawings. The same reference symbols are attached to the same parts, and repeated description of the parts may be omitted.

EMBODIMENTS

Figure 1:
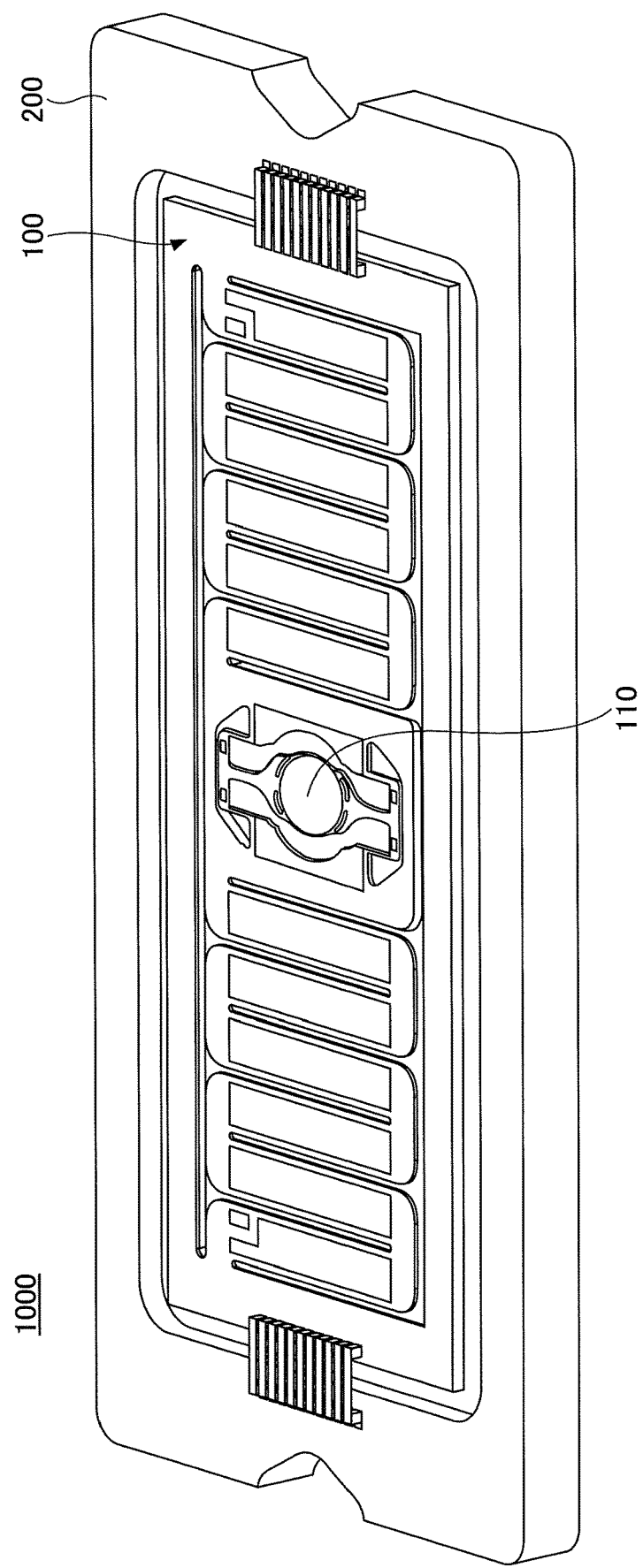
FIG. 1 is a perspective view illustrating an example of a light scanning apparatus of an embodiment.
Figure 2:
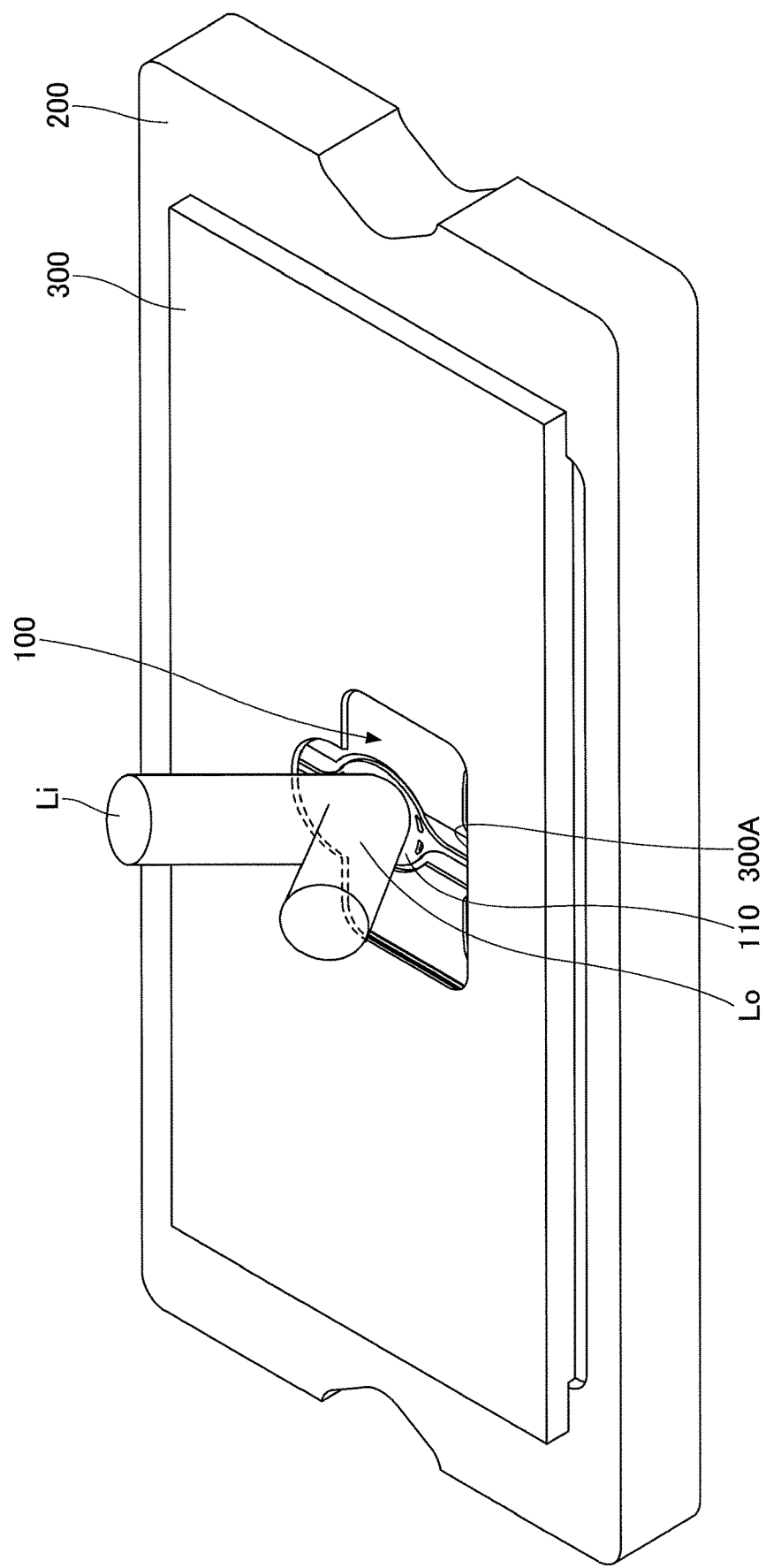
FIG. 2 is another perspective view illustrating the example of the light scanning apparatus of the embodiment.

A light scanning apparatus of an embodiment is described. FIGS. 1 and 2 are perspective views of an example of the light scanning apparatus. FIG. 1 illustrates the light scanning apparatus in a state where a package cover is removed. FIG. 2 illustrates the light scanning apparatus in a state where the package cover is attached.

As illustrated in FIGS. 1 and 2, a light scanning apparatus 1000 includes a light scanning part 100, a ceramic package 200 in which the light scanning part 100 is installed, and a package cover 300 disposed on the ceramic package 200 and covers the light scanning part 100. The light scanning apparatus 1000 may include a substrate, a control circuit, and so on on the lower side of the ceramic package.

In the light scanning apparatus 1000, an opening portion 300A is formed at a substantially center portion of a package cover 300. A vicinity of a mirror 110 having a light reflection surface is exposed from the opening portion 300A. The opening portion 300A is shaped so as not to interrupt laser incident light Li toward the mirror and laser outgoing light Lo (scanning light) from the mirror 110.

In the opening portion 300A, a part through which the laser incident light Li passes is opened smaller than a part through which the laser outgoing light Lo passes. Said differently, the part through which the laser incident light Li passes includes an opening having a substantially semicircular shape. The part through which the laser outgoing light Lo passes includes an opening having a substantially rectangular shape. Although it is sufficient for the the part through which the laser incident light Li to be opened in a predetermined direction only in which the laser incident light Li is input, it is necessary for the part through which the laser outgoing light Lo passes to be opened by an entire range of two-dimensionally scanning so as not to interrupt the laser outgoing light Lo two-dimensionally output by the scanning.

Figure 3:
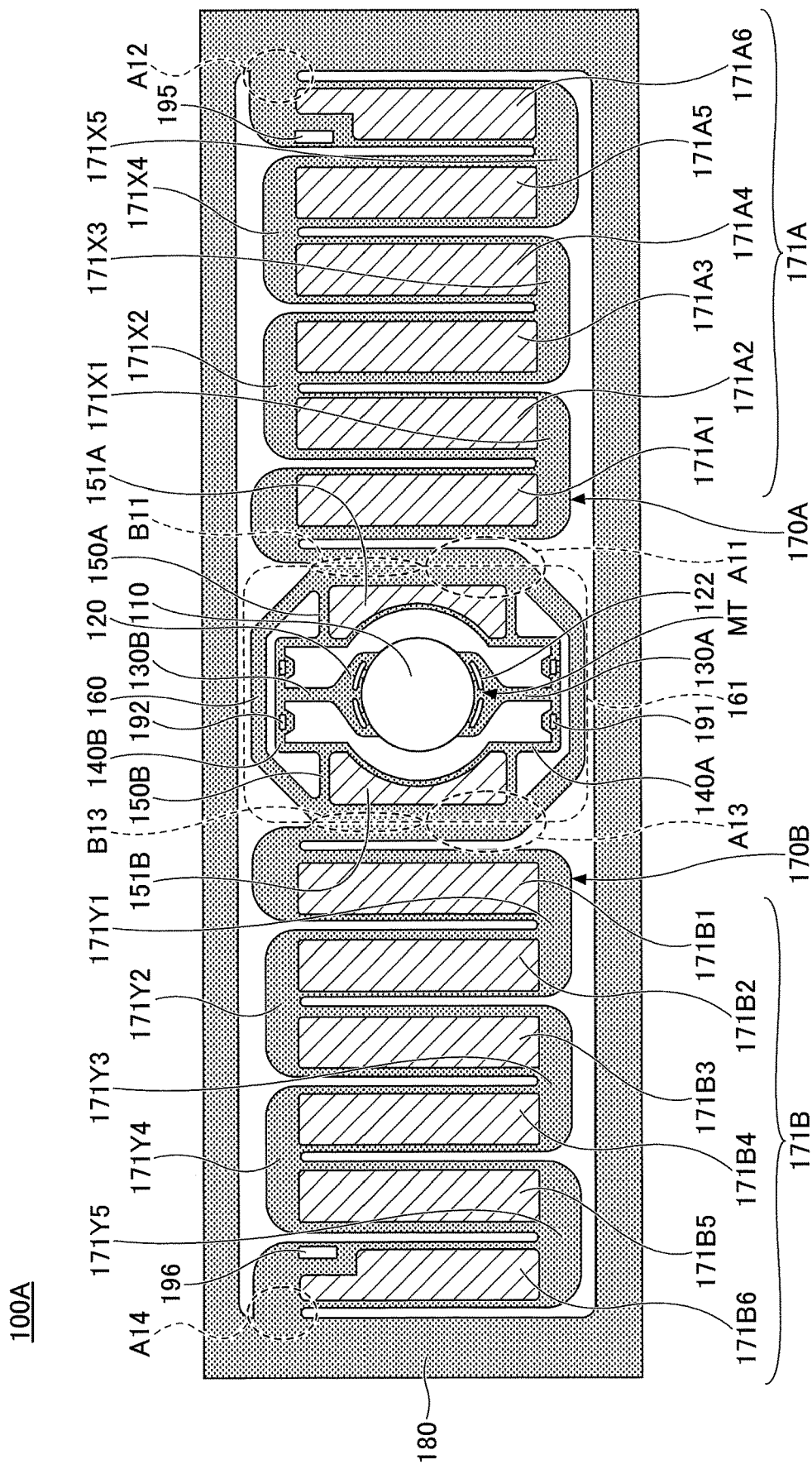
FIG. 3 is a plan view of an example of a light scanning part of the light scanning apparatus of the embodiment on an upper surface side.
Figure 4:
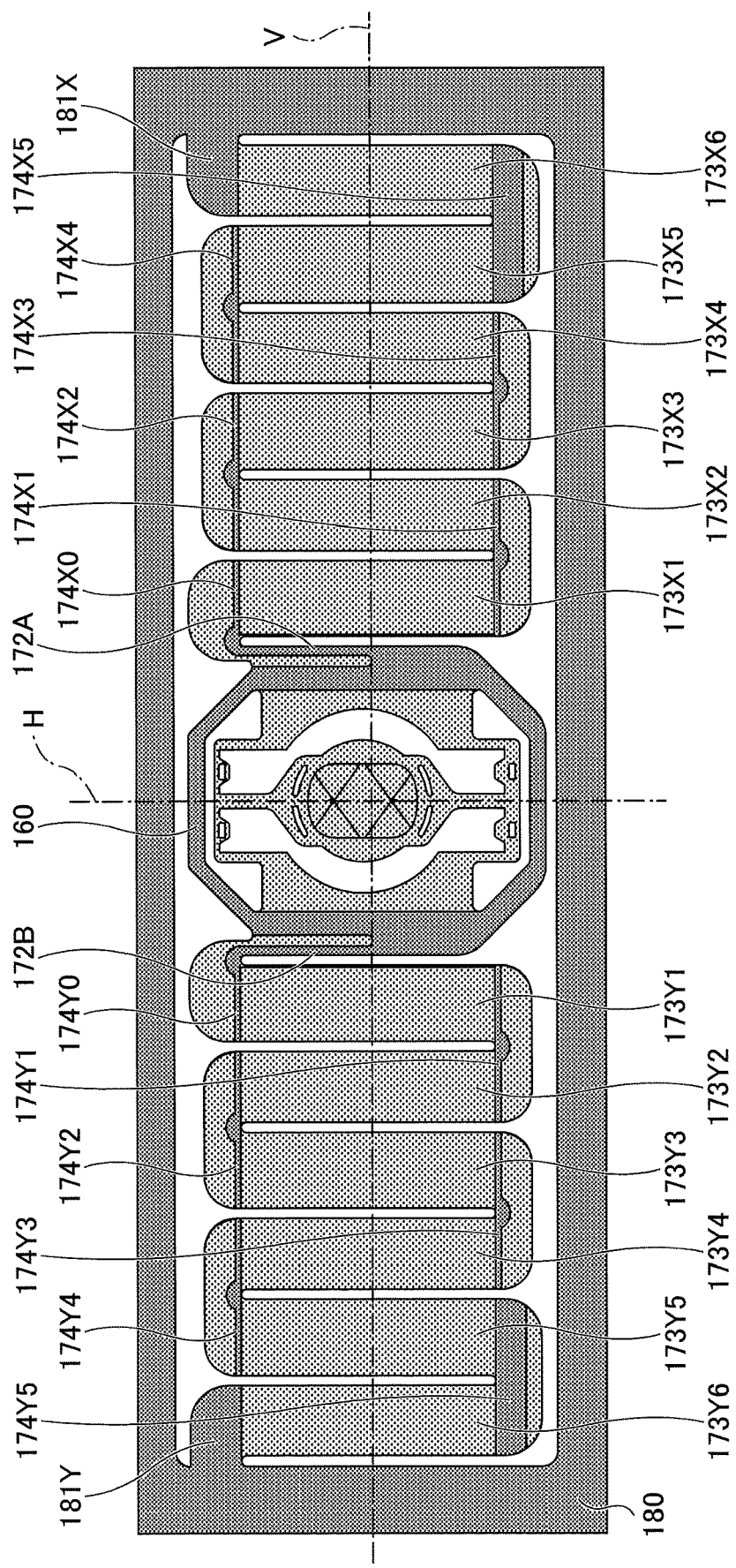
FIG. 4 is a plan view of the example of the light scanning part of the light scanning apparatus of the embodiment on a lower surface side.

Described next is the light scanning part 100 of the light scanning apparatus 1000. FIG. 3 is a plan view of an example of a light scanning part 100A of the light scanning apparatus of the embodiment on an upper surface side. FIG. 4 is a plan view of the example of the light scanning part 100A of the light scanning apparatus of the embodiment on a lower surface side.

As illustrated in FIGS. 3 and 4, the light scanning part 100A is provided to scan the laser incident light emitted from a light source by swinging the mirror 110. The light scanning part 100A is, for example, a Micro Electro Mechanical Systems (MEMS) mirror, in which the mirror 110 is driven by a piezoelectric element.

The light scanning part 100A includes a mirror 110, a mirror supporting portion 120, torsion beams 130A and 130B, connection beams 140A and 140B, horizontal drive beams 150A and 150B, a movable frame 160, vertical drive beams 170A and 170B, and a fixed frame 180. The mirror is supported on the upper surface of the mirror supporting portion 120. Within the embodiment, the mirror supporting portion 120, the torsion beams 130A and 130B, the connection beams 140A and 140B, the horizontal drive beams 150A and 150B, and the movable frame 160 are collectively called a mirror supporting body 161.

A pair of vertical drive beams 170A and 170B connected to the mirror supporting body 161 are disposed on both sides of the mirror supporting body 161. The mirror supporting body 161 is connected to the vertical drive beam 170A by a mirror supporting body connecting portion A11. The fixed frame 180 is connected to the vertical drive beam 170A by a fixed frame connecting portion A12. The mirror supporting body 161 is connected to the vertical drive beam 170B by a mirror supporting body connecting portion A13. The fixed frame 180 is connected to the vertical drive beam 170B by a fixed frame connecting portion A14. The vertical drive beams 170A and 170B will be described in detail later.

As illustrated in FIGS. 3 and 4, a pair of horizontal drive beams 150A and 150B connected to the mirror supporting portion 120 are disposed on both sides of the mirror supporting portion 120 for supporting the mirror 110, respectively. Outsides of the horizontal drive beam 150A and 150B, the connection beams 140A and 140B, the torsion beams 130A and 130B, the mirror supporting portion 120, and the mirror 110 are supported by the movable frame 160. Said differently, one side of each horizontal drive beam 150A and 150B is supported by the movable frame 160. The other side of the horizontal drive beam 150A extends onto an inner peripheral side and is connected with the connection beams 140A and 140B. Similarly, the other side of the horizontal drive beam 150B extends onto the inner peripheral side and is connected with the connection beams 140A and 140B. The connection beams 140A and 140B are connected to the torsion beams 130A and 130B extending in a direction of the horizontal rotation axis H. The torsion beams 130A and 130B support both sides of the mirror supporting portion 120 along the horizontal rotation axis. The horizontal drive beams 150A and 150B are paired and provided in a direction orthogonal to the direction of the horizontal rotation axis H, through which the torsion beams 130A and 130B extend, so as to interpose the mirror 110 and the mirror supporting portion 120 among the horizontal drive beams 150A and 150B. The direction of the horizontal rotation axis H is described later.

The horizontal drive beams 150 respectively have horizontal drive sources 151A and 151B. The vertical drive beams 170A and 170B respectively include the vertical drive sources 171A and 171B. The torsion beams 130A and 130B, the horizontal drive beams 150A and 150B connected to the torsion beams 130A and 130B through the connection beams 140A and 140B, the movable frame 160 that is a frame body connected to the horizontal drive beams 150A and 150B, the vertical drive beams 170A and 170B connected to the movable frame 160, and the fixed frame 180 connected to the vertical drive beams 170A and 170B function as an actuator for scanning a laser beam by up and down or right and left swinging the mirror 110 supported by the mirror supporting portion 120.

The horizontal drive sources 151A and 151B are respectively formed on upper surfaces of the horizontal drive beams 150A and 150B. The horizontal drive sources 151A and 151B include an upper electrode, which is formed on a thin film (hereinafter, referred to as a "piezoelectric thin film") of the piezoelectric element on the upper surface of horizontal drive beam 150A and 150B, and an lower electrode, which is formed on the lower surface of the piezoelectric thin film. The horizontal drive sources 151A and 151B extend or contract in response to the polarity of the drive voltage applied to the upper and lower electrodes.

By applying drive voltages of sine waves having opposite phases respectively to the horizontal drive beam 150A and the horizontal drive beam 150B, the horizontal drive beam 150A and the horizontal drive beam 150B located on the left and right sides of the mirror 110 alternately oscillate up and down sides. With this, the mirror 110 can be swung around the horizontal rotation axis H by making the torsion beams 130A and 130B a swing axis or a rotation axis. Here, the direction in which the mirror 110 swings around an axis of the torsion beams 130A and 130B is called the horizontal direction, and the horizontal rotation axis H passes through the center of a light reflection surface of the mirror 110 along the above swing axis or the rotation axis. For example, resonant oscillation is used for horizontal drive performed by the horizontal drive beams 150A and 150B to enable high-speed swing drive of the mirror 110.

A slit 122 is formed in the mirror supporting portion 120 along the circumference of the mirror 110. The weight of the mirror supporting portion 120 can be reduced by the slit 122, and simultaneously torsion caused by the torsion beams 130A and 130B can be transferred to the mirror 110.

As illustrated in FIGS. 3 and 4, the vertical drive beam 170A includes multiple rectangular vertical beams extending in the direction of the horizontal rotation axis H so as to be shaped like a zig-zag by connecting end portions of adjacent vertical beams.

For example, if the vertical beams are counted from the side of the mirror supporting body 161, an end of the first vertical beam 173X1 and an end of the second vertical beam 173X2 are connected by a turn-back portion 171X1. An end of the second vertical beam 173X2 and an end of the third vertical beam 173X3 are connected by a turn-back portion 171X2. An end of the third vertical beam 173X3 and an end of the fourth vertical beam 173X4 are connected by a turn-back portion 171X3. An end of the fourth vertical beam 173X4 and an end of the fifth vertical beam 173X5 are connected by a turn-back portion 171X4. An end of the fifth vertical beam 173X5 and an end of the sixth vertical beam 173X6 are connected by a turn-back portion 171X5.

Similarly, the vertical drive beam 170B includes multiple rectangular vertical beams extending in the direction of the horizontal rotation axis H so as to be shaped like a zig-zag by connecting end portions of adjacent vertical beams.

For example, if the vertical beams are counted from the side of the mirror supporting body 161, an end of the first vertical beam 173Y1 and an end of the second vertical beam 173Y2 are connected by a turn-back portion 171Y1. An end of the second vertical beam 173Y2 and an end of the third vertical beam 173Y3 are connected by a turn-back portion 171Y2. An end of the third vertical beam 173Y3 and an end of the fourth vertical beam 173Y4 are connected by a turn-back portion 171Y3. An end of the fourth vertical beam 173Y4 and an end of the fifth vertical beam 173Y5 are connected by a turn-back portion 171Y4. An end of the fifth vertical beam 173Y5 and an end of the sixth vertical beam 173Y6 are connected by a turn-back portion 171Y5.

On the upper surfaces of the vertical drive beams 170A and 170B, vertical drive sources 171A and 171B, which are a rectangular unit without a curved portion, are formed for each of the vertical beams 173X1, 173X2, 173X3, 173X4, 173X5, 173X6, 173Y1, 173Y2, 173Y3, 173Y4, 173Y5, and 173Y6. The vertical drive source 171A includes six vertical drive sources 171A1, 171A2, 171A3, 171A4, 171A5, and 171A6, which are respectively formed on the first to sixth vertical beams forming the vertical drive beam 170A. The vertical drive source 171B includes six vertical drive sources 171B1, 171B2, 171B3, 171B4, 171B5, and 171B6, which are respectively formed on the first to sixth vertical beams forming the vertical drive beam 170B. The vertical drive source 171A includes an upper electrode formed on the piezoelectric thin film on the upper surface of the vertical drive beam 170A and a lower electrode formed on the lower surface of the piezoelectric thin film. The vertical drive source 171B includes an upper electrode formed on the piezoelectric thin film on the upper surface of the vertical drive beam 170B and a lower electrode formed on the lower surface of the piezoelectric thin film.

A drive voltage having a waveform upward and downward inverted based on a central value of the drive waveform between the vertical drive sources 171A and 171B, which are adjacent, is applied so as to change a deformation amount of the adjacent vertical beams in the upward direction. Then, the vertical drive beams 170A and 170B transmit accumulation of up-and-down motion of each vertical beam to the movable frame 160. The mirror 1100 and the mirror supporting portion 120 are swung in the direction orthogonal to the direction of the horizontal rotation axis H by movement of the vertical drive beams 170A and 170B. This swung direction is called the vertical direction. The swing axis passing through the center of the light reflection surface of the mirror 110 is called the vertical rotation axis V. For example, the vertical drive by the vertical drive beams 170A and 170B uses non-resonant oscillation.

For example, the mirror 110 and the mirror supporting body 161 can be swung in the vertical direction around the vertical rotation axis V by driving the vertical drive sources 171A1, 171B1, 171A3, 171B3, 171A5, and 171B5 using identical waveforms and driving the vertical drive sources 171A2, 171B2, 171A4, 171B4, 171A6 and 171B6 using the identical waveforms having a different phase.

The light scanning part 100A includes piezoelectric sensors 191 and 192 as a horizontal deflection angle sensor that detects tilting (the deflection angle in the horizontal direction) of the mirror 110 in the horizontal direction in a state in which the mirror is swinging in the horizontal direction by applying the drive voltage to the horizontal drive sources 151A and 151B. The piezoelectric sensor 191 is installed in the connection beam 140A, and the piezoelectric sensor 192 is installed in the connection beam 140B.

The light scanning part 100A includes piezoelectric sensors 195 and 196 as a vertical deflection angle sensor that detects tilting (the deflection angle in the vertical direction) of the mirror 110 in the vertical direction in a state in which the mirror is swinging in the vertical direction by applying the drive voltage to the vertical drive sources 171A and 171B. The piezoelectric sensor 195 is installed in one of vertical beams forming the vertical drive beam 170A, and the piezoelectric sensor 196 is installed in one of vertical beams forming the vertical drive beam 170B.

In the light scanning apparatus of the embodiment, the light scanning part is made with a Silicon on Insulator (SOI) substrate including an active layer, a buried oxide (BOX) film, and a supporting layer, for example. The fixed frame 180, the movable frame 160, and ribs are made from the active layer, the buried oxide film, and the supporting layer. Meanwhile, the torsion beams 130A and 130B, the horizontal drive beams 150A and 150B, and the vertical drive beams 170A and 170B are made with the active layer. Or, the torsion beams 130A and 130B, the horizontal drive beams 150A and 150B, and the vertical drive beams 170A and 170B are made with the active layer and buried oxide film. Therefore, the fixed frame 180, the movable frame 160, and the ribs are heavier than the torsion beams 130A and 130B, the horizontal drive beams 150A and 150B, and the vertical drive beams 170A and 170B.

In the light scanning apparatus of the embodiment, on the back surface of the vertical drive beam 170A, the rib is formed where the vertical beams are connected. A rib 174X0 is formed at a position where the innermost vertical beam 173X1 is connected to the movable frame 160. A rib 174X1 is formed at a position where the vertical beams 173X1 and 173X2 are connected to the turn-back portion 171X1. A rib 174X2 is formed at a position where the vertical beams 173X2 and 173X3 are connected to the turn-back portion 171X2. A rib 174X3 is formed at a position where the vertical beams 173X3 and 173X4 are connected to the turn-back portion 171X3. A rib 174X4 is formed at a position where the vertical beams 173X4 and 173X5 are connected to the turn-back portion 171X4. A rib 174X5 is formed at a position where the vertical beams 173X5 and 173X6 are connected to the turn-back portion 171X5. Here, the rib 174X5 is formed to be wide on a side of the turn-back portion 171X5 so that the weight at a connecting position among the vertical beams 173X5 and 173X6 and the turn-back portion 171X5 becomes heavier than the weights of the other connecting positions.

Similarly, the ribs are formed at the connecting positions of the vertical beams on the back surface of the vertical drive beam 170B. A rib 174Y0 is formed at a position where the innermost vertical beam 173Y1 is connected to the movable frame 160. A rib 174Y1 is formed at a position where the vertical beams 173Y1 and 173Y2 are connected to the turn-back portion 171Y1. A rib 174Y2 is formed at a position where the vertical beams 173Y2 and 173Y3 are connected to the turn-back portion 171Y2. A rib 174Y3 is formed at a position where the vertical beams 173Y3 and 173Y4 are connected to the turn-back portion 171Y3. A rib 174Y4 is formed at a position where the vertical beams 173Y4 and 173Y5 are connected to the turn-back portion 171Y4. A rib 174Y5 is formed at a position where the vertical beams 173Y5 and 173Y6 are connected to the turn-back portion 171Y5. Here, the rib 174Y5 is formed to be wide on a side of the turn-back portion 171Y5 so that the weight at a connecting position among the vertical beams 173Y5 and 173Y6 and the turn-back portion 171Y5 becomes heavier than the weights of the other connecting positions.

As illustrated in FIG. 4, fixed portions 181X and 181Y protrude into the insides of fixed frame connecting portions A12 and A14 so as to be connected to the vertical beams 173X6 and 173Y6. The fixed portions 181X and 181Y are formed by three layers of the active layer, the buried oxide layer, and the supporting layer of the SOI substrate in a manner similar to the fixed frame 180. The weight of the fixed portions 181X and 181Y is heavier than the weight of the vertical drive beams 170A and 170B so that the fixed portions 181X and 181Y becomes a starting point of oscillation for the vertical drive beams 170A and 170B.

In the light scanning apparatus of the embodiment, the weights at the connecting position among the vertical beams 173X5 and 173X6 and the turn-back portion 171X5 and the connecting position among the vertical beams 173Y5 and 173Y6 and the turn-back portion 171Y5 become heavier than the weights of the other connecting positions. When the vertical drive beam performs resonant oscillation, the weight of the turn-back portion causes a phase delay so as to perform a counter effect of suppressing oscillation of the other beams.

In the light scanning apparatus of the embodiment, the center of gravity of the mirror 110 and the mirror supporting body 161 is on the vertical rotation axis V. This is attained by making the movable frame 160 heavier on an opposite side (a side provided with the mirror supporting body connecting portions A11 and A13) opposite to a side relative to the vertical rotation axis V. Further, in the light scanning apparatus of the embodiment with which the mirror 110 can be swung in both the directions around the vertical rotation axis V and the horizontal rotation axis H, the center of gravity of the mirror 110 and the mirror supporting portion 120 is positioned at the crossing point between the vertical rotation axis V and the horizontal rotation axis H. With this, a weight balance between the mirror 110 and the mirror supporting body 161 is optimized so as to suppress occurrence of ringing at a time of the vertical drive.

Figure 5:
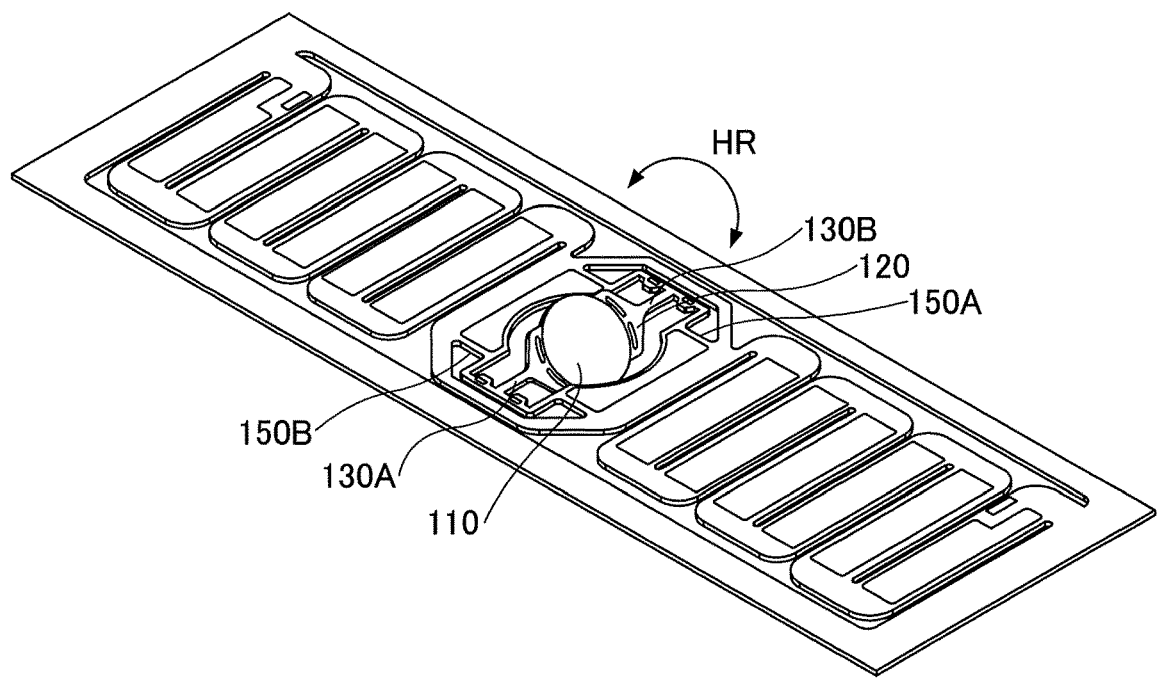
FIG. 5 is a perspective view illustrating a posture of driving the light scanning part of the light scanning apparatus of the embodiment.

FIG. 5 is a perspective view illustrating a posture of driving the light scanning part of the light scanning apparatus of the embodiment. In the light scanning part of the light scanning apparatus of the embodiment, a predetermined voltage is applied to the horizontal drive beam 150A and the horizontal drive beam 150B so that the mirror 110 installed in the mirror supporting portion 120 can be swung by horizontal direction resonant drive HR around a swing axis or a rotation axis of the torsion beams 130A and 130B.

Figure 6:
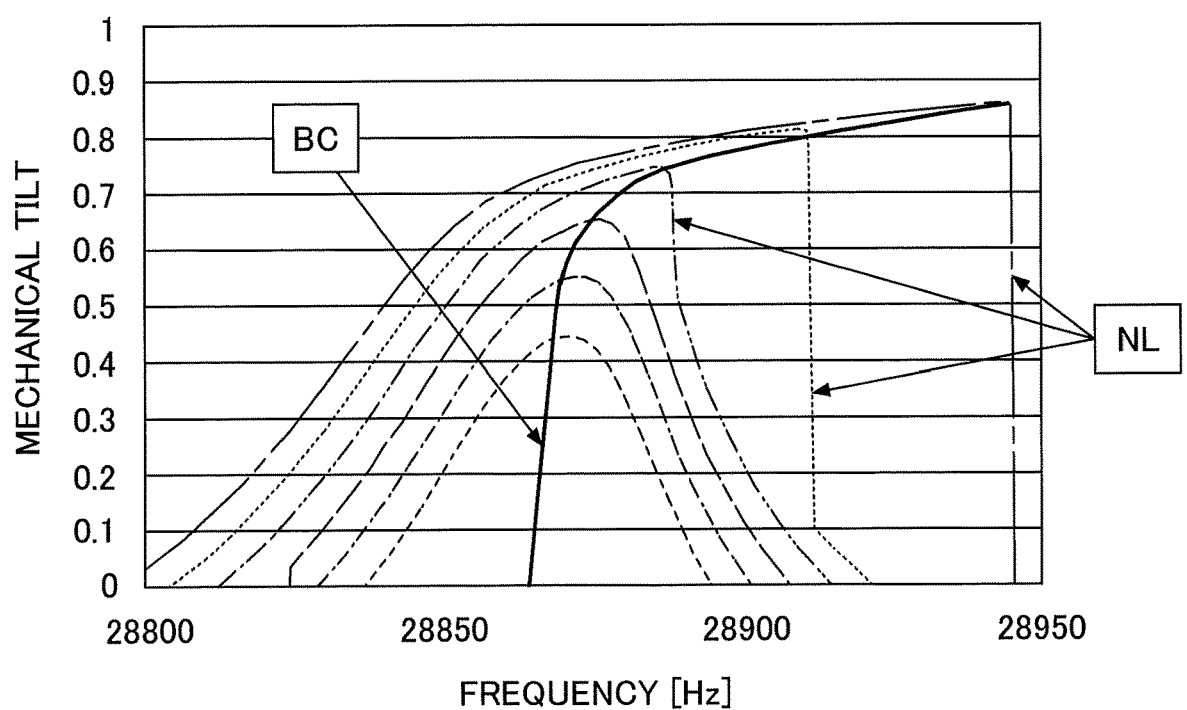
FIG. 6 illustrates characteristic curves of a backbone curve in the light scanning part of the light scanning apparatus of a comparative example.

FIG. 6 illustrates characteristic curves of a backbone curve (a curve obtained by connecting resonance points at a time of expanding a deflection angle by increasing an applied voltage applied to the piezoelectric element) in a light scanning part of the light scanning apparatus of a comparative example. The deflection angle is enlarged when the applied voltage is increased by fixing the frequency. Here, because non-linearity is not optimized in the actuator of the light scanning apparatus of the comparative example, the backbone curve tilts onto a low or high frequency side by expanding the deflection angle at a time of the resonant drive. In FIG. 6, the backbone curve tilts to the high frequency side. When the backbone curve BC greatly tilts, the non-linear leaping phenomenon NL tends to appear in the frequency response. The non-linear leaping phenomenon NL is a phenomenon in which the deflection angle abruptly changes at a certain frequency in the frequency response of the deflection angle. The non-linear leaping phenomenon NL appears due to non-linearity of a reverse piezoelectric characteristic of a piezoelectric element and non-linearity being the summation of structural non-linearity of the actuator.

In a case where the non-linearity is not optimized in the actuator of the light scanning apparatus of the comparative example, there is a phenomenon in which the backbone curve tilts on a side of low or high frequency in the characteristic curve of the deflection angle relative to the frequency. In this case, even if the drive voltage is increased the deflection angle is saturated to prevent a large deflection angle from obtaining.

As illustrated in the backbone curve of the comparative example, if it is planned to cause the light scanning apparatus to be driven at the resonance point, the resonance frequency tilts by the increase of the deflection angle. Further, if it is driven in a frequency range for almost generating non-linear leaping phenomenon in order to expand the deflection angle as much as possible, the deflection angle abruptly decrease when a frequency change happens due to an outer temperature change or aging degradation.

Figure 7B:
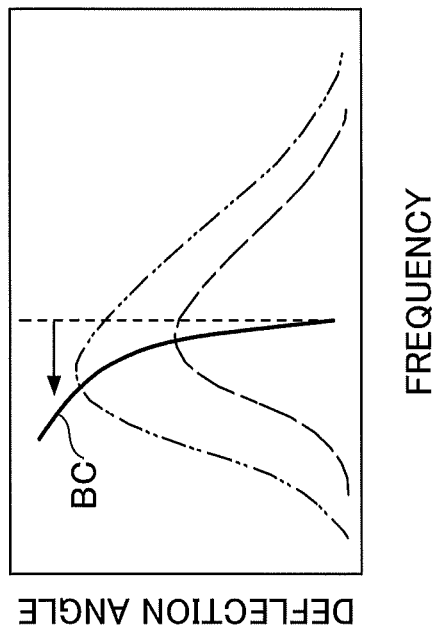
FIGS. 7A and 7B illustrate problems related to the backbone curves.
Figure 7A:
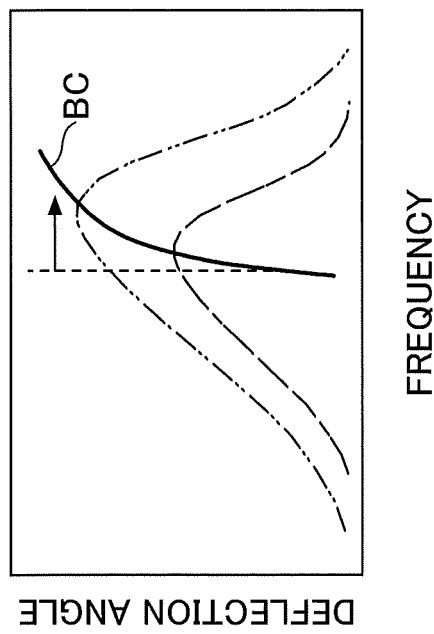

FIGS. 7A and 7B illustrate problems related to the backbone curves. As illustrated in FIG. 7A, when the piezoelectric non-linearity is dominant, the backbone curve tilts on a higher frequency. As illustrated in FIG. 7B, when the structural non-linearity is dominant, the backbone curve tilts on a lower frequency. If the piezoelectric non-linearity and the structural non-linearity are well balanced, non-linearity as the entire actuator disappears.

However, the structural non-linearity is changed while maintaining the piezoelectric non-linearity to have a certain constant value, the spring constant is simultaneously changed. Therefore, there is an optimum value of the spring constant k corresponding to the structural non-linear constant $\beta$.

Duffing equation as a theoretical formula of a non-linear equation is indicated in the following [Equation 2].

[Equation 2]

$$J\frac{d^2\theta}{dt^2} + C\frac{d\theta}{dt} + k\theta + \beta\theta^3 = T\sin\omega t \quad (2)$$

Here, the symbols indicate as follows. J: inertia; $\theta$: mirror deflection angle; t: time; C: attenuation coefficient; k: spring constant; $\beta$: structural non-linear constant; T: torque (rotative force by inverse voltage); and $\omega$: angular frequency.

[Equation 3] is a result of an obtained tilt structural non-linear shape tilting in a lower frequency side so as to balance with an experimentally prepared piezoelectric non-linearity backbone curve tilting in a higher frequency side.

[Equation 3]

$$\beta = 0.05 \times k - 9.5 \times 10^{-6} \quad (3)$$

FIG. 8 is a graph of Equation 3 for illustrating a relation of k (the spring constant) of the light scanning part of the light scanning apparatus relative to $\beta$ (the structural non-linear constant) of the Embodiment. The horizontal axis represents k [Nm/rad], and the vertical axis represents $\beta$ [Nm/rad3]. A straight line corresponding to [Equation 3] is indicated as the non-linear 0 line. Referring to FIG. 8, the backbone curve tilts onto the low frequency side in an area A1 in which $\beta$ is greater than the non-linear 0 line. Meanwhile, the backbone curve tilts onto the high frequency side in an area A2 in which $\beta$ is smaller than the non-linear 0 line.

First Embodiment

Figure 9:
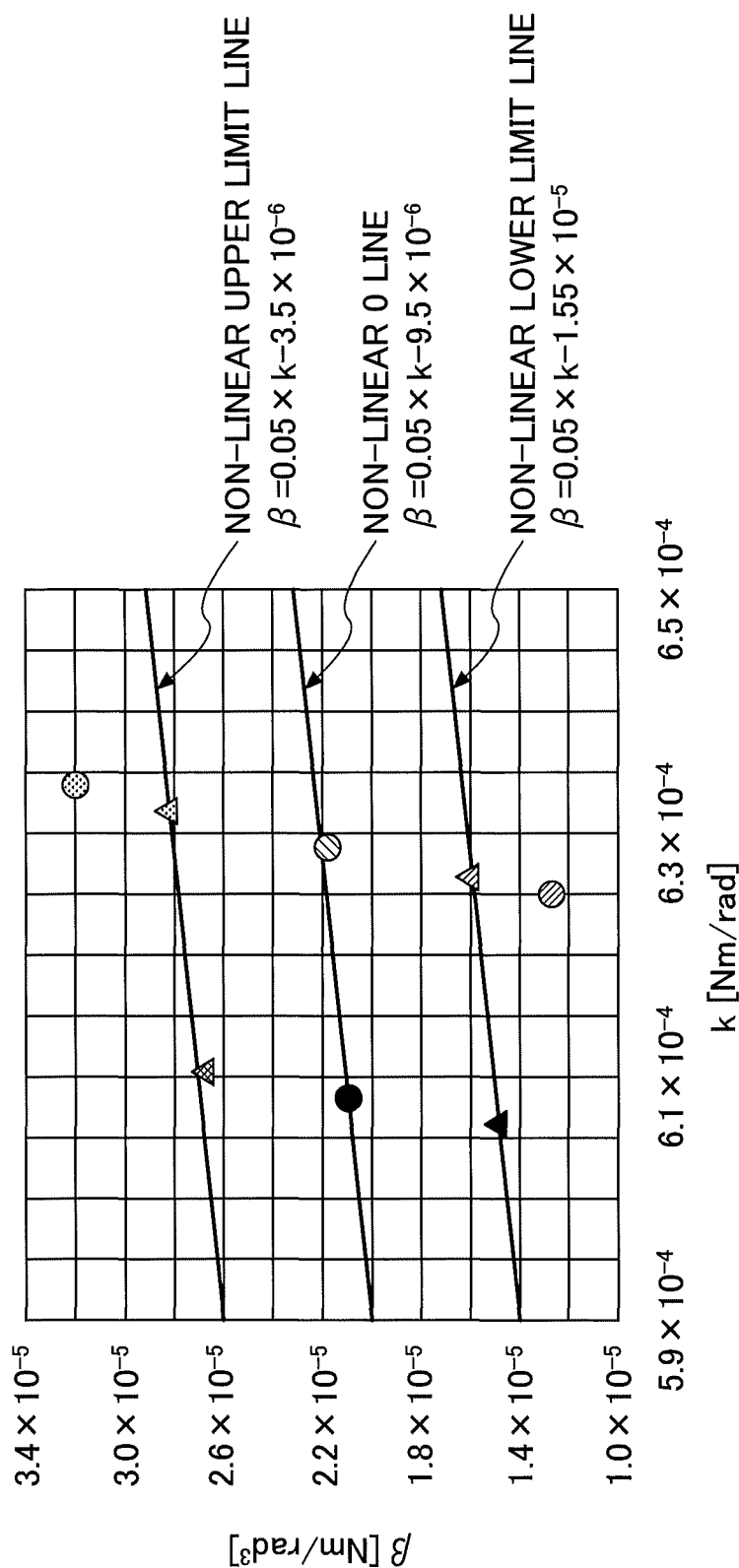
FIG. 9 illustrates a relation of k (the spring constant) of the light scanning part of the light scanning apparatus relative to β (the structural non-linear constant) of an example and a comparative example.

FIG. 9 illustrates a relation of k (the spring constant) of the light scanning part of the light scanning apparatus relative to $\beta$ (the structural non-linear constant) of Examples 1-6 and Comparative Examples 1 and 2. A frequency response (the characteristics of the deflection angle relative to the frequency) is simulated to calculate for the light scanning part of the light scanning apparatus having a relation between $\beta$ and k illustrated in FIG. 9.

Figure 10:
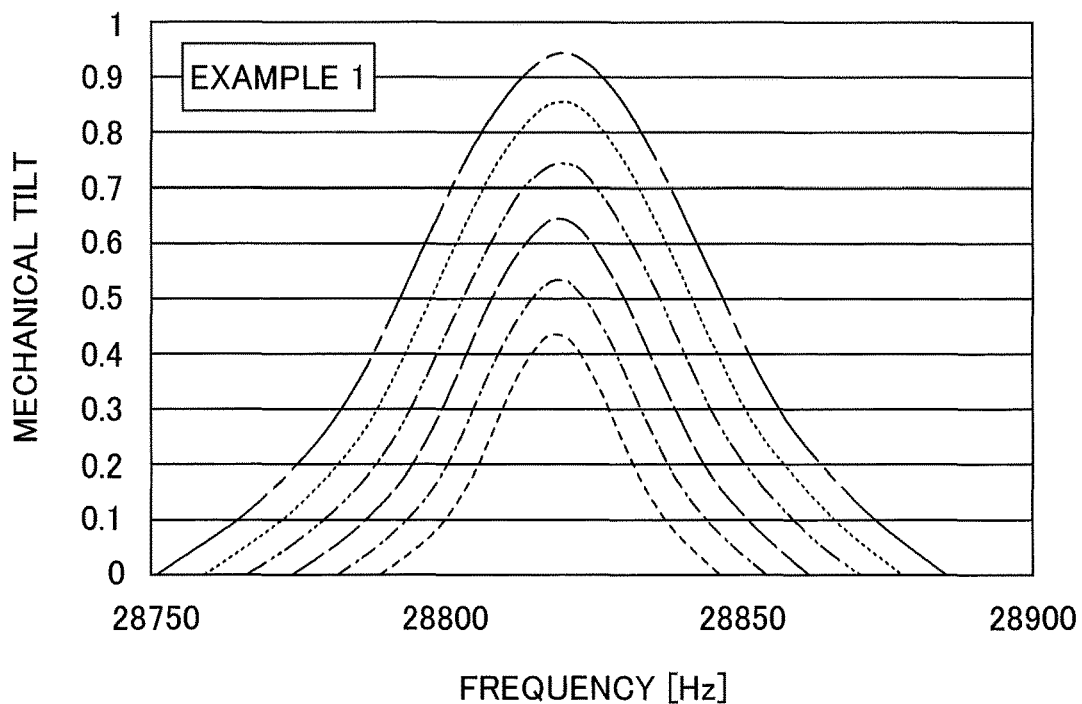
FIG. 10 illustrates characteristics of a deflection angle relative to the frequency of the light scanning part of the light scanning apparatus of Example 1.

FIG. 10 illustrates characteristics of the deflection angle relative to the frequency of the light scanning part of the light scanning apparatus of Example 1. In Example 1, there is no tilt of the backbone curve and no non-linear oscillation is caused. The backbone curves corresponding to Examples 2-6 and Comparative Examples 1 and 2 are indicated using the deflection angle normalized by the maximum deflection angle of Example 1.

Figure 11:
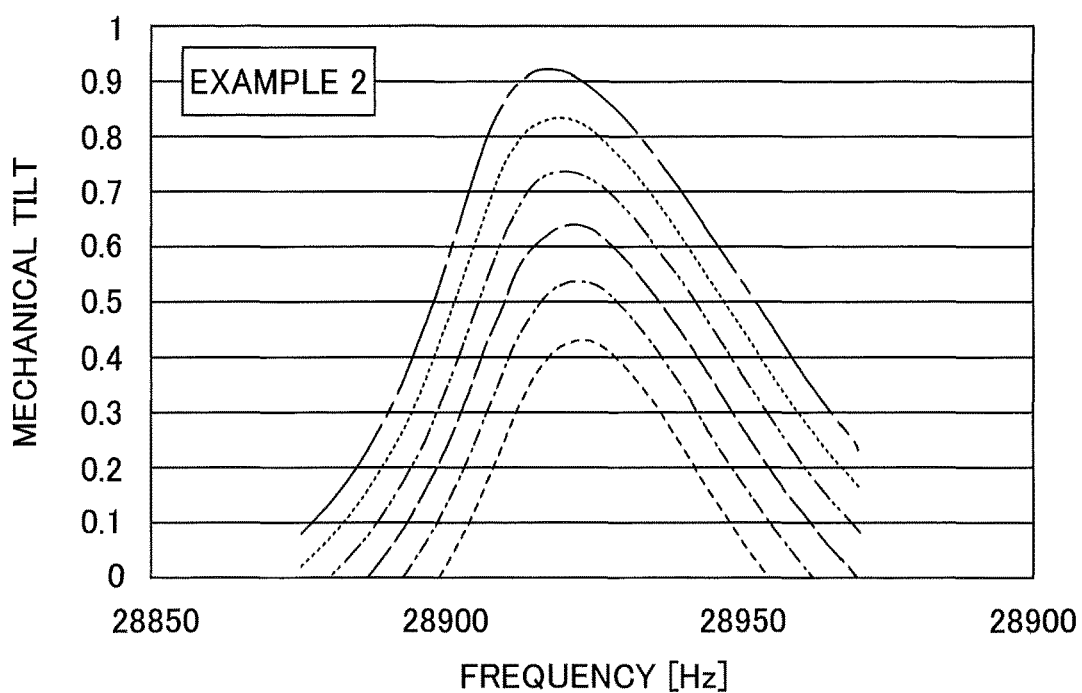
FIG. 11 illustrates characteristics of the deflection angle relative to the frequency of the light scanning part of the light scanning apparatus of Example 2.

FIG. 11 illustrates characteristics of the deflection angle relative to the frequency of the light scanning part of the light scanning apparatus of Example 2. In Example 2, the structural non-linearity is rather strong so as to tilt the backbone curve to a lower frequency side. However, the non-linear leaping phenomenon does not occur.

Figure 12:
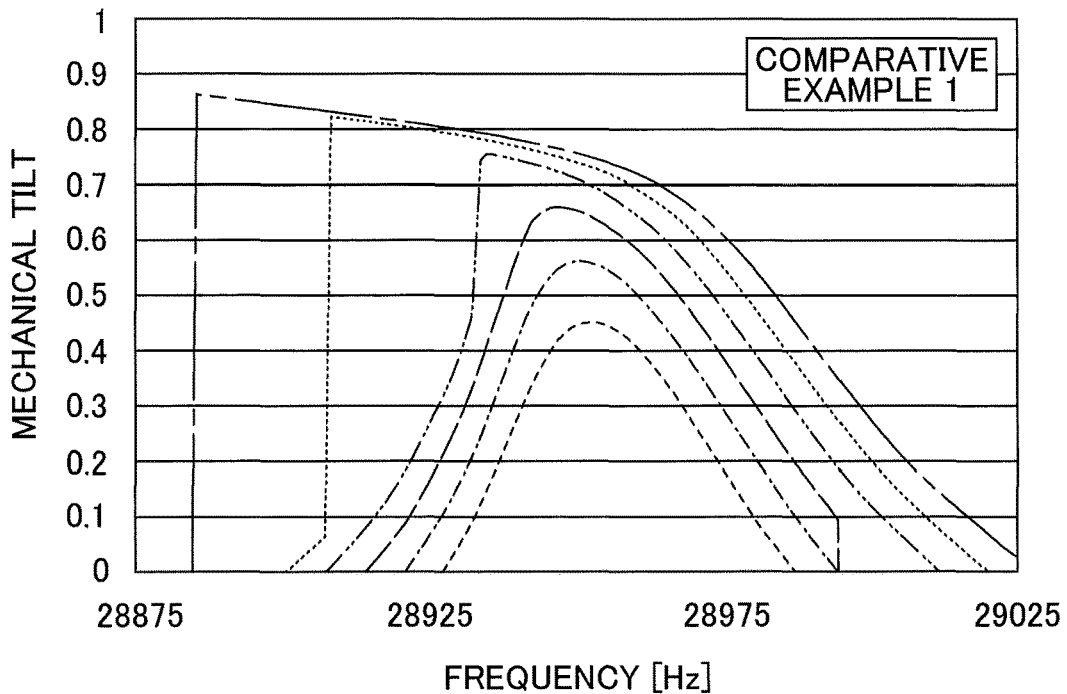
FIG. 12 illustrates characteristics of the deflection angle relative to the frequency of the light scanning part of the light scanning apparatus of Comparative Example 1.

FIG. 12 illustrates characteristics of the deflection angle relative to the frequency of the light scanning part of the light scanning apparatus of Comparative Example 1. In Comparative Example 1, the structural non-linearity is strong so as to strongly tilt the backbone curve to the lower frequency side, and the non-linear leaping phenomenon occurs.

Figure 13:
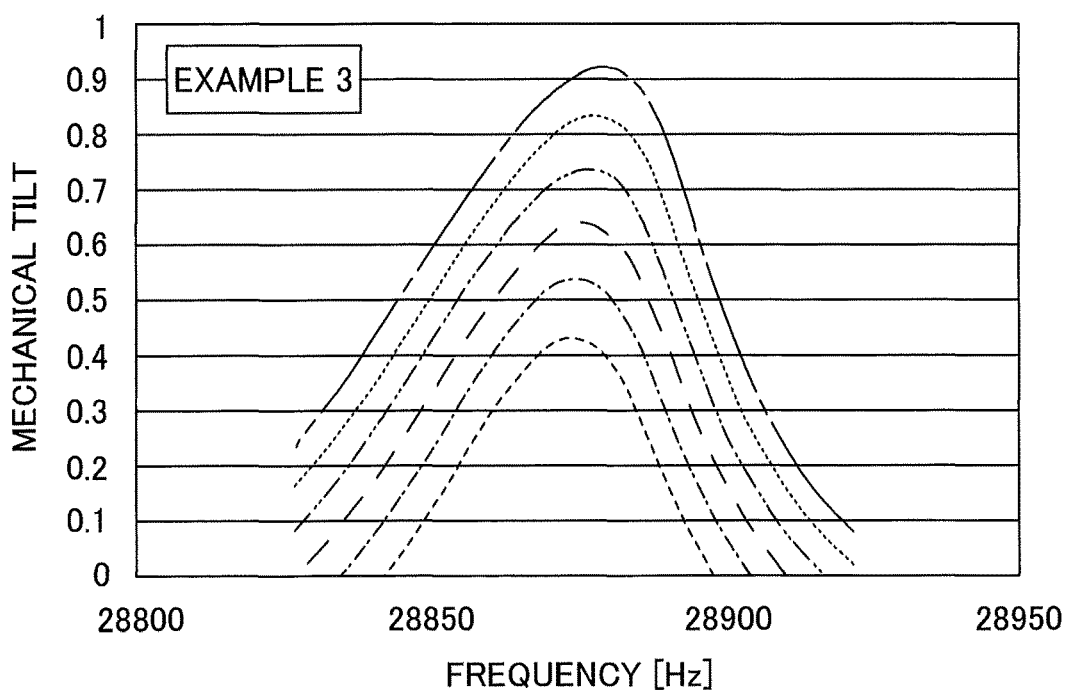
FIG. 13 illustrates characteristics of the deflection angle relative to the frequency of the light scanning part of the light scanning apparatus of Example 3.

FIG. 13 illustrates characteristics of the deflection angle relative to the frequency of the light scanning part of the light scanning apparatus of Example 3. In Example 3, the piezoelectric non-linearity is rather strong so as to tilt the backbone curve to a higher frequency side. However, the non-linear leaping phenomenon does not occur.

Figure 14:
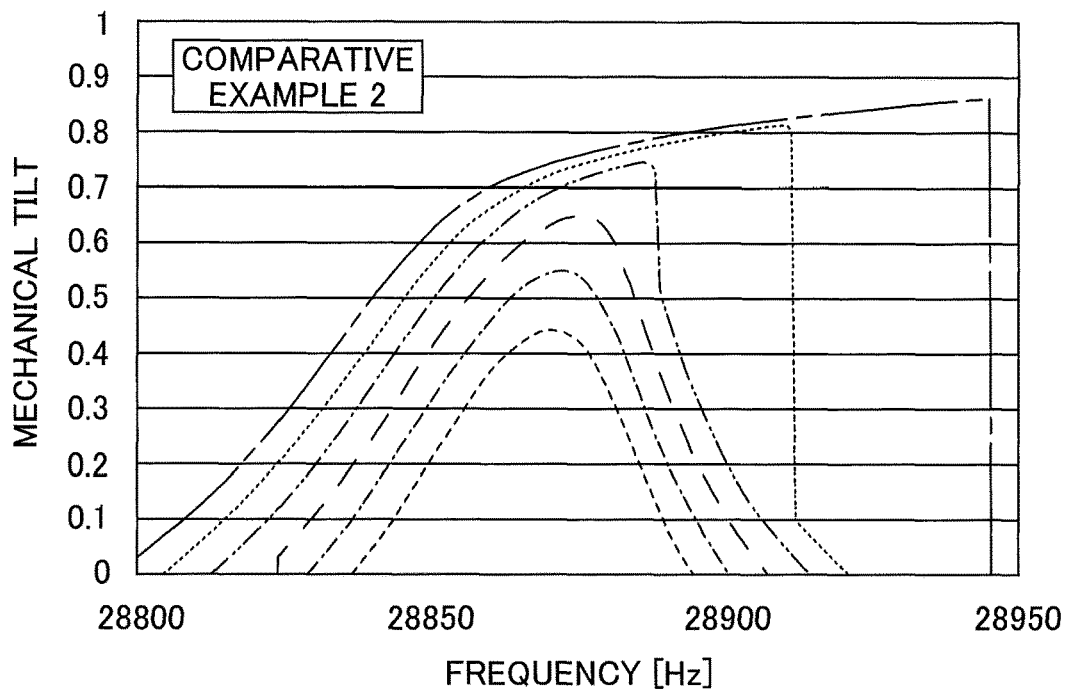
FIG. 14 illustrates characteristics of the deflection angle relative to the frequency of the light scanning part of the light scanning apparatus of Comparative Example 2.

FIG. 14 illustrates characteristics of the deflection angle relative to the frequency of the light scanning part of the light scanning apparatus of Comparative Example 2. In Comparative Example 2, the piezoelectric non-linearity is strong so as to strongly tilt the backbone curve to the higher frequency side, and the non-linear leaping phenomenon occurs.

Figure 15:
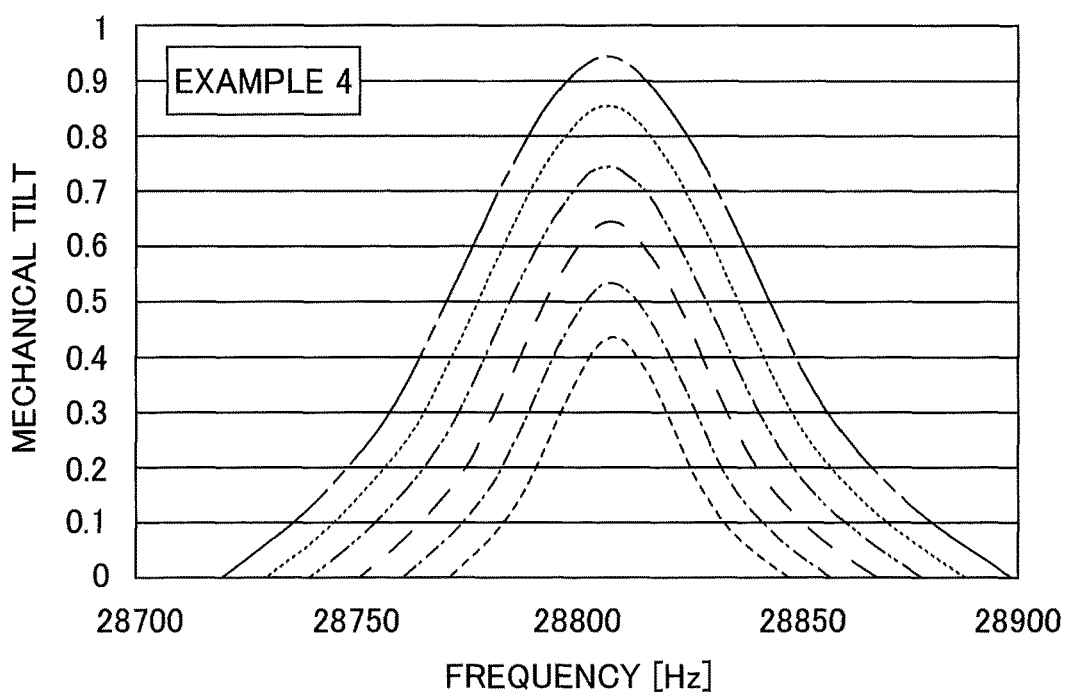
FIG. 15 illustrates characteristics of the deflection angle relative to the frequency of the light scanning part of the light scanning apparatus of Example 4.

FIG. 15 illustrates characteristics of the deflection angle relative to the frequency of the light scanning part of the light scanning apparatus of Example 4. In Example 4, the characteristics are substantially similar to those of Example 1. There is no tilt of the backbone curve and no non-linear oscillation is caused.

Figure 16:
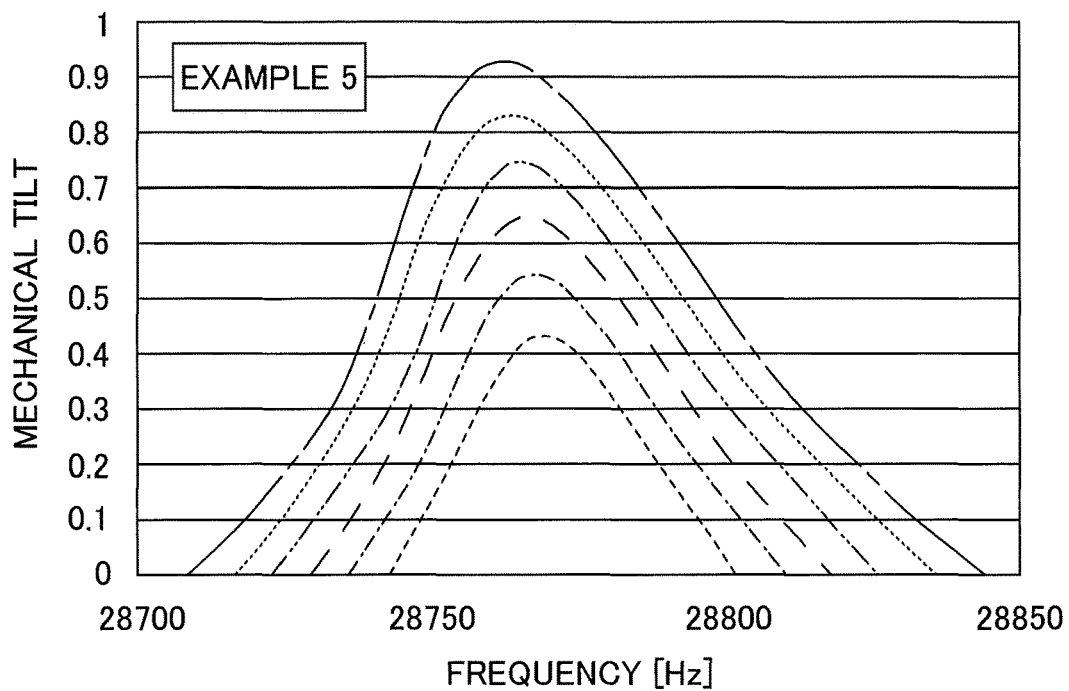
FIG. 16 illustrates characteristics of the deflection angle relative to the frequency of the light scanning part of the light scanning apparatus of Example 5.

FIG. 16 illustrates characteristics of the deflection angle relative to the frequency of the light scanning part of the light scanning apparatus of Example 5. In Example 5, the characteristics are substantially similar to those of Example 2. The structural non-linearity is rather strong so as to tilt the backbone curve to the lower frequency side. However, the non-linear leaping phenomenon does not occur.

Figure 17:
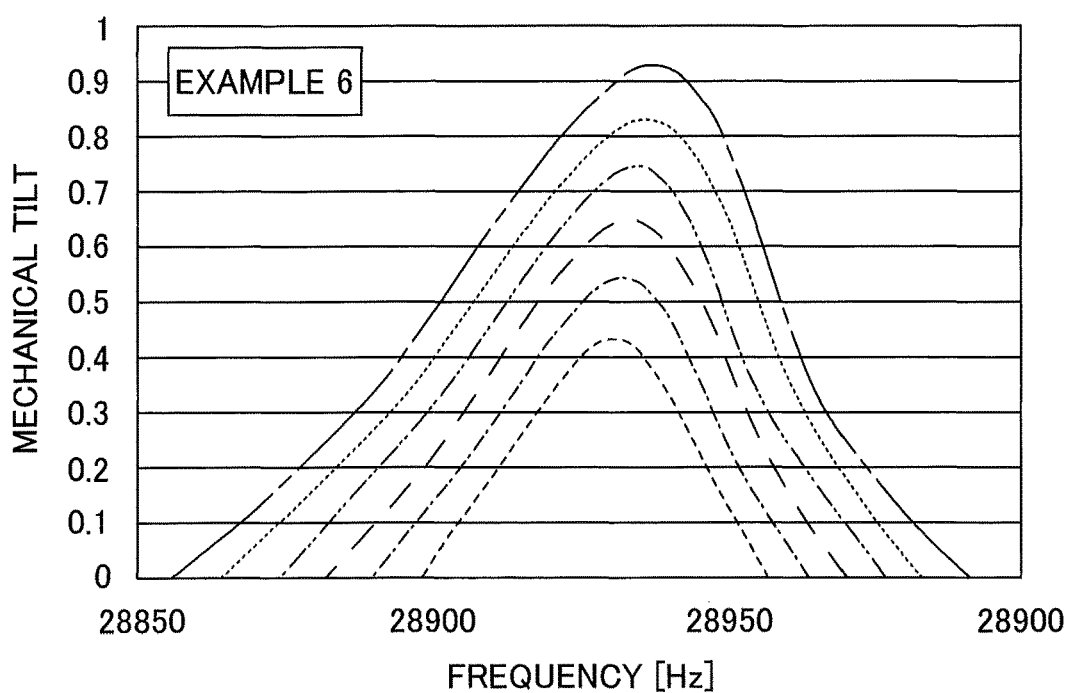
FIG. 17 illustrates characteristics of the deflection angle relative to the frequency of the light scanning part of the light scanning apparatus of Example 6.

FIG. 17 illustrates characteristics of the deflection angle relative to the frequency of the light scanning part of the light scanning apparatus of Example 6. In Example 6, the characteristics are substantially similar to those of Example 3. The piezoelectric non-linearity is rather strong so as to tilt the backbone curve to the higher frequency side. However, the non-linear leaping phenomenon does not occur.

Within Examples 1 and 4, combinations of $\beta$ and k on the non-linear 0 line indicated by Equation 3 obtained using an experiment and a theory described above. In Examples 1 and 4, there is no tilt of the backbone curve and no non-linear oscillation is caused.

[Equation 3]

$$\beta = 0.05 \times k - 9.5 \times 10^{-6} \quad (3)$$

Within Examples 2 and 5, combinations of β and k on the non-linear upper limit line indicated by Equation 4 as follows. In Examples 2 and 5, the structural non-linearity is rather strong so as to tilt the backbone curve to the lower frequency side. However, the non-linear leaping phenomenon does not occur. As in Comparative Example 1, the backbone curve tilts strongly to the lower frequency side in an area higher than the non-linear upper limit line so as to generate the non-linear leaping phenomenon.

[Equation 4]

$$\beta = 0.05 \times k - 3.5 \times 10^{-6} \quad (4)$$

Within Examples 3 and 6, combinations of β and k on the non-linear lower limit line indicated by Equation 5 as follows. In Examples 3 and 6, the piezoelectric non-linearity is rather strong so as to tilt the backbone curve to the lower frequency side. However, the non-linear leaping phenomenon does not occur. As in Comparative Example 2, the backbone curve tilts strongly to the higher frequency side in an area lower than the non-linear lower limit line so as to generate the non-linear leaping phenomenon.

[Equation 5]

$$\beta = 0.05 \times k - 1.55 \times 10^{-5} \quad (5)$$

Equation 1 is obtainable by combining Equations 3, 4, and 5 as an equation indicating an area sandwiched between the non-linear lower limit line and the non-linear upper limit line.

[Equation 1]

$$\beta = 0.05 \times k - A \times 10^{-6} \quad (1)$$

where 3.5≤A≤15.5.

An actuator forming the light scanning part of the light scanning apparatus of the Embodiment suppresses a leaping phenomenon caused by non-linear oscillation occurring at a time of resonant drive in the actuator so as to enable a stable drive at a large deflection angle. When the tilt of the backbone curve does not present or is very small, and if the drive is performed at the resonance point to expand the deflection angle, a shift of the resonance frequency does not present or is very small. Because the non-linear leaping phenomenon does not occur, an abrupt decrease of the deflection angle can be suppresses at a time when the frequency changed due to an outer temperature change or aging degradation.

Second Embodiment

Figure 18:
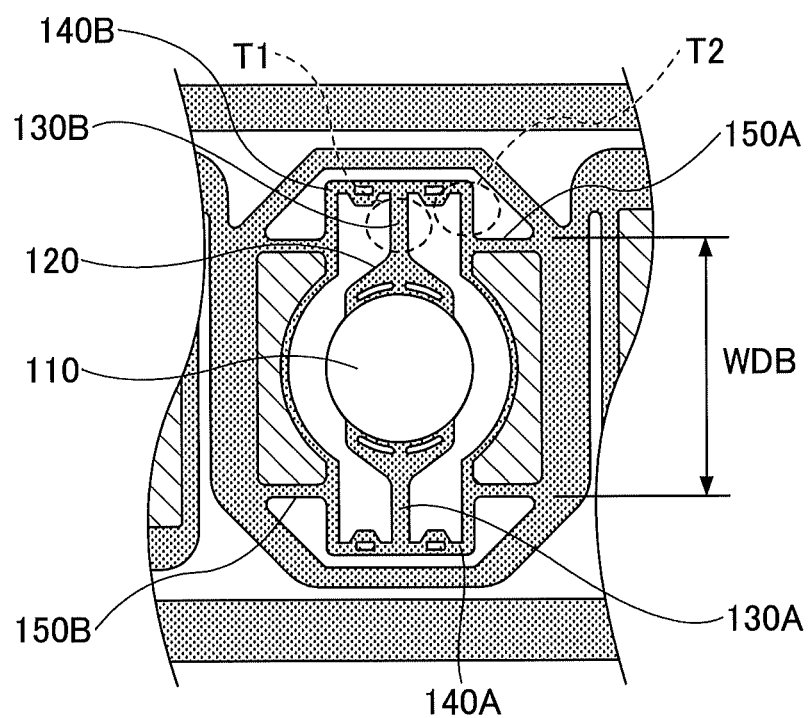
FIG. 18 is a plan view of an enlarged important portion of the light scanning part of the light scanning apparatus of the embodiment.

FIG. 18 is a plan view of an enlarged important portion of the light scanning part of the light scanning apparatus of the embodiment. The light scanning apparatus of the first embodiment relates to the non-linear 0 line. The light scanning apparatus of the second embodiment related to the non-linear upper limit line is achieved by changing the sizes of the following points: (1) The width of a minimum portion of the torsion beam in an area T1 is made thin; (2) The width of a minimum portion of the connection beam in an area T2 is made wide; (3) The length of the connection beam in the area T2 is made short; (4) The width WDB of a horizontal drive beam is made wide.

The light scanning apparatus of Example 3 related to the non-linear lower limit line is achieved by changing the sizes of the light scanning apparatus of Example 1 at the following points. (1) The width of the minimum portion of the torsion beam in the area T1 is made large. (2) The width of the minimum portion of the connection beam in the area T2 is made thin. (3) The length of the connection beam in the area T2 is made long. (4) The width WDB of the horizontal drive beam is made thin.

As described above, when the stiffness of the torsion beam in the area T1 is high, and both the stiffness of the connection beam and the stiffness of the horizontal drive beam are low, β tends to be small. On the contrary, when the stiffness of the torsion beam in the area T1 is low, and both the stiffness of the connection beam and the stiffness of the horizontal drive beam are high, β tends to be high.

By changing β and k, because various characteristics such as (1) drive resonance frequency, (2) drive voltage sensitivity, (3) static/dynamic flatness of the mirror, (4) a used deflection angle and the maximum deflection angle (stress limit), and (5) consistency between a vertical drive source and a resonance frequency change, it is necessary to determine an optimum combination between β and k in consideration of the specification of the light scanning apparatus.

Modified Example 1

Figure 19:
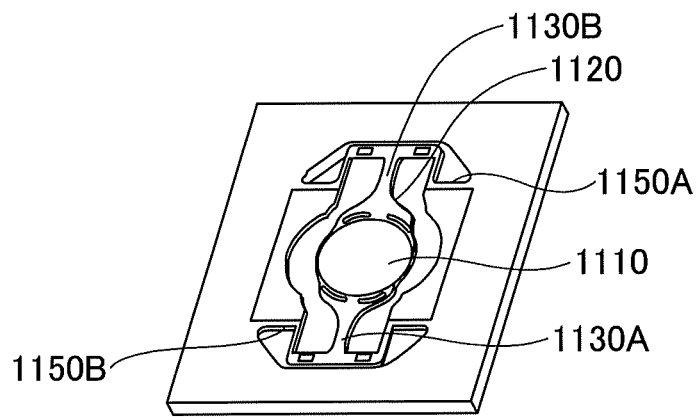
FIG. 19 is a perspective view of the light scanning part of the light scanning apparatus of Modified Example 1.

FIG. 19 is a perspective view of the light scanning part of the light scanning apparatus of Modified Example 1. The light scanning part of the light scanning apparatus is a resonance 1D-MEMS mirror. In the light scanning part, the torsion beams 1130A and 1130B are connected to both sides of a mirror supporting portion 1120 supporting the mirror 1110, and the torsion beams 1130A and 1130B are connected to horizontal drive beams 1150A and 1150B through connection beams, and the horizontal drive beams 1150A and 1150B are connected to a fixed frame. Comparing to the light scanning part of the light scanning apparatus having the structures illustrated in FIGS. 3 and 4, the vertical drive beam is removed and the movable frame is changed to the fixed frame. The horizontal drive beam of the light scanning part of the modified example 1 drives the mirror supporting portion using resonant drive. An actuator forming the light scanning part of the light scanning apparatus illustrated in FIG. 19 suppresses the leaping phenomenon caused by non-linear oscillation occurring at a time of resonant drive in the actuator so as to enable a stable drive at a large deflection angle.

Modified Example 2

Figure 20:
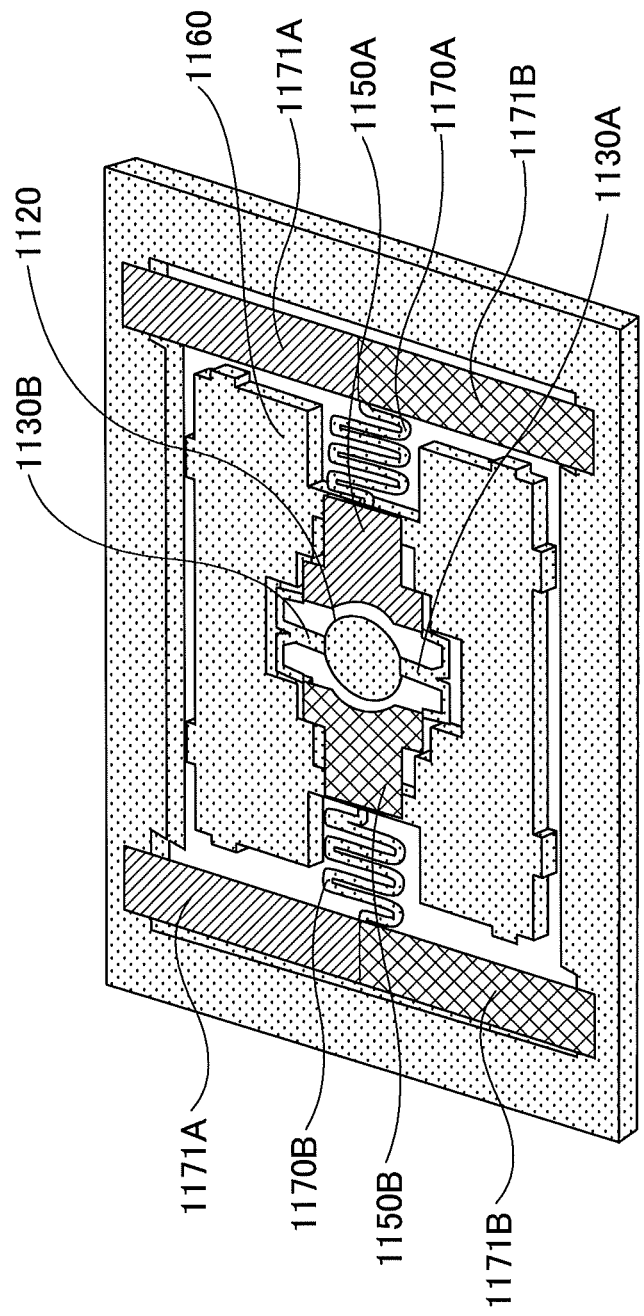
FIG. 20 is a perspective view of the light scanning part of the light scanning apparatus of Modified Example 2.

FIG. 20 is a perspective view of the light scanning part of the light scanning apparatus of Modified Example 2. The light scanning part of the light scanning apparatus is a resonance/non-resonance 2D-MEMS mirror. In the light scanning part, the torsion beams 1130A and 1130B are connected to both sides of the mirror supporting portion 1120 supporting the mirror 1110, and the torsion beams 1130A and 1130B are connected to horizontal drive beams 1150A and 1150B through connection beams, and the horizontal drive beams 1150A and 1150B are connected to a movable frame 1160. Vertical drive beams 1170A and 1170B are connected to the movable frame 1160 and are connected a fixed frame through a beam having horizontal drive sources 1171A and 1171B. The horizontal drive beam of the light scanning part of the modified example 2 drives the mirror supporting portion in a direction of rotating around the horizontal rotation axis by resonant drive in a horizontal drive part, and also drives the movable frame including the mirror supporting portion in a direction of rotating around the vertical rotation axis by resonant drive in a vertical drive part and a vertical drive source. The actuator forming the light scanning part of the light scanning apparatus illustrated in FIG. 20 suppresses the leaping phenomenon caused by non-linear oscillation occurring at a time of resonant drive in the actuator so as to enable a stable drive at a large deflection angle.

The present disclosure is provided in consideration of the above. The objects of the present invention are to suppress occurrence of a leaping phenomenon caused by non-linear oscillation during resonant drive of an actuator in the actuator and to enable stable driving under a large deflection angle.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority or inferiority of the invention. Although an actuator has been described in detail, it should be understood that various changes, substitutions, and alterations could be made thereto without departing from the spirit and scope of the invention.

What is claimed is:

1. An actuator comprising:
   a torsion beam configured to support a target object;
   a first drive beam having a first drive source; and
   a connection beam configured to connect the torsion beam with the first drive beam; and
   a frame body configured to fix the first drive beam,
   wherein the actuator applies force of rotating the torsion beam in a direction around a first axis by a resonant drive of the first drive beam so as to cause the target object to swing, and
   when a structural non-linear constant of the actuator is β [Nm/rad3] and a spring constant of the actuator is k [Nm/rad], [Equation 1] is satisfied:

[Equation 1]

$$\beta = 0.05 \times k - A \times 10^{-6} \quad (1),$$

where $3.5 \le A \le 15.5$.

2. The actuator according to claim 1, the actuator further comprising:
   a fixed frame provided at an outer periphery of the frame body; and
   a second drive beam provided by connecting the frame body and the fixed frame.

3. The actuator according to claim 2,
   wherein the target object including the frame body is swung in a direction of rotating around a second axis orthogonal to the first axis by driving the second drive beam.

4. The actuator according to claim 3, the actuator further comprising:
   a second drive beam formed on a surface of the second drive beam so as to drive the second drive beam.

5. The actuator according to claim 3, the actuator further comprising:
   a second drive beam formed in a beam provided on a root of the second drive beam so as to drive the second drive beam.

6. A light scanning apparatus
   a mirror having a light reflection surface;
   a mirror supporting portion configured to support the mirror;
   a torsion beam configured to support the mirror supporting portion;
   a drive beam having a drive source; and
   a connection beam configured to connect the torsion beam with the drive beam;
   a frame body configured to fix the drive beam; and
   an actuator applying force of rotating the torsion beam in a direction around a predetermined axis by a resonant drive of the drive beam so as to cause the target object to swing, and
   when a structural non-linear constant of the actuator is β [Nm/rad3] and a spring constant of the actuator is k [Nm/rad], [Equation 1] is satisfied:

[Equation 1]

$$\beta = 0.05 \times k - A \times 10^{-6} \quad (1),$$

where $3.5 \le A \le 15.5$.

* * * * *